(12) United States Patent
Hu et al.

(10) Patent No.: US 8,270,185 B2
(45) Date of Patent: Sep. 18, 2012

(54) SWITCHING MODE POWER SUPPLY WITH A SPECTRUM SHAPING CIRCUIT

(75) Inventors: Jin Hu, Hangzhou (CN); Junming Zhang, Hangzhou (CN); Yuancheng Ren, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 389 days.

(21) Appl. No.: 12/697,979

(22) Filed: Feb. 1, 2010

(65) Prior Publication Data

US 2010/0302816 A1 Dec. 2, 2010

(30) Foreign Application Priority Data

May 26, 2009 (CN) .......................... 2009 1 0059429

(51) Int. Cl.
*H02M 3/335* (2006.01)
(52) U.S. Cl. ................... 363/21.13; 363/21.05
(58) Field of Classification Search ............... 363/21.04, 363/21.07, 21.09, 21.12, 21.15, 21.17, 21.05, 363/21.13
See application file for complete search history.

(56) References Cited

U.S. PATENT DOCUMENTS

| | | | |
|---|---|---|---|
| 6,204,649 B1 | 3/2001 | Roman | |
| 6,249,876 B1 * | 6/2001 | Balakrishnan et al. | 713/501 |
| 6,388,429 B1 | 5/2002 | Mao | |
| 6,643,317 B1 * | 11/2003 | Blumer | 375/130 |
| 6,687,319 B1 * | 2/2004 | Perino et al. | 375/367 |
| 7,208,926 B2 * | 4/2007 | Mitsuo | 323/282 |
| 7,423,494 B1 | 9/2008 | Xin-LeBlanc | |
| 2003/0174005 A1 | 9/2003 | Latham et al. | |
| 2007/0133234 A1 | 6/2007 | Huynh et al. | |
| 2009/0231894 A1 * | 9/2009 | Moon et al. | 363/89 |
| 2009/0296437 A1 * | 12/2009 | Li et al. | 363/89 |

* cited by examiner

*Primary Examiner* — Adolf Berhane
*Assistant Examiner* — Emily Pham
(74) *Attorney, Agent, or Firm* — Perkins Coie LLP

(57) ABSTRACT

In accordance with the teachings described herein, systems and methods are provided for a switching mode power supply. In one example, the switching mode power supply may include a transformer, a switching circuit and a switching control circuit. The transformer receives a DC input voltage on a primary winding and generates a DC output voltage on a secondary winding. The switching circuit, which may include a MOSFET switch, is coupled to the transformer and is configured to switch the transformer on and off. The switching control circuit generates a switching control signal to control the switching circuit in order to regulate the DC output voltage of the transformer. The switching control circuit is configured to generate the switching control signal as a function of a timing signal having a varying frequency, wherein the varying frequency of the timing signal causes a switching frequency of the switching circuit to vary over a period of time in order to reduce electromagnetic interference caused by the switching circuit.

9 Claims, 12 Drawing Sheets

SWITCHING MODE POWER SUPPLY WITH A SPECTRUM SHAPING CIRCUIT

CROSS-REFERENCE TO RELATED APPLICATIONS

This application claims priority to and the benefit of Chinese Patent Application No. 200910059429.7, filed May 26, 2009, which is incorporated herein by reference in its entirety.

FIELD

The technology described in this patent document relates generally to switching mode power supplies.

BACKGROUND AND SUMMARY

In a typical switching mode power supply, the harmonics caused by the switching frequency will often add to the electromagnetic interference (EMI) of the overall system. This can be particularly problematic for power supplies with a large amount of harmonic gain caused by a high switching frequency. It would therefore be advantageous to provide a switching mode power supply that can operate at high switching frequencies with a reduced effect on EMI.

In accordance with the teachings described herein, systems and methods are provided for a switching mode power supply. In one example, the switching mode power supply may include a transformer, a switching circuit and a switching control circuit. The transformer receives a DC input voltage on a primary winding and generates a DC output voltage on a secondary winding. The switching circuit, which may include a MOSFET switch, is coupled to the transformer and is configured to switch the transformer on and off. The switching control circuit generates a switching control signal to control the switching circuit in order to regulate the DC output voltage of the transformer. The switching control circuit is configured to generate the switching control signal as a function of a timing signal having a varying frequency, wherein the varying frequency of the timing signal causes a switching frequency of the switching circuit to vary over a period of.

In another example, the switching mode power supply may include a rectifier, a transformer, a switching circuit and a switching control circuit. The rectifier receives an AC input voltage and converts the AC input voltage into a DC input voltage. The transformer is configured to convert a DC input voltage on its primary winding into a DC output voltage on its secondary winding. The switching circuit is coupled to the primary winding of the transformer and is configured to control current flow through the primary winding of the transformer based on a switching control signal. The switching control circuit generates the switching control signal as a function of a timing signal having a varying frequency, wherein the varying frequency of the timing signal causes a switching frequency of the switching circuit to vary over a period of time in order to reduce electromagnetic interference caused by the switching circuit.

A method for regulating an output voltage in a switching mode power supply may include the following steps: generating a timing signal having a varying frequency; monitoring one or more operating characteristics of a transformer that generates the output voltage to generate a feedback signal; generating a switching control signal as a function of the timing signal and the feedback signal; and using the switching control signal to switch the transformer on and off to regulate the output voltage, wherein the varying frequency of the timing signal causes a switching frequency of the transformer to vary over a period of time in order to reduce electromagnetic interference.

DETAILED DESCRIPTION

Figure 1:
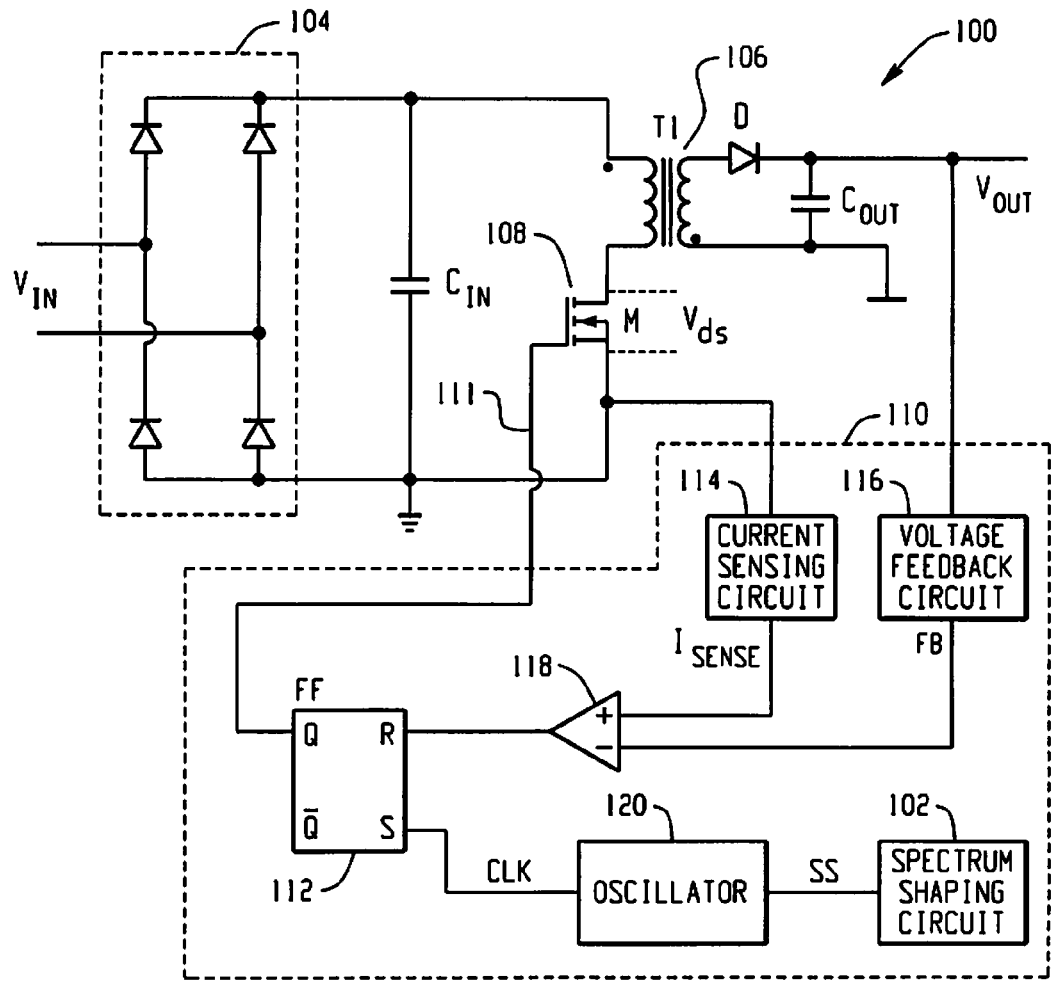
FIG. 1 is a diagram of an example switching mode power supply having a spectrum shaping circuit.

FIG. 1 is a diagram of an example switching mode power supply 100 having a spectrum shaping circuit 102. The switching mode power supply 100 includes a rectifier bridge 104, a transformer 106, a switching circuit 108, and a switching control circuit 110. In operation, the rectifier bridge 104 receives an AC input voltage ($V_{in}$) that it converts to a DC input voltage received by the primary winding of the transformer 106. The transformer 106 is controlled by the switching circuit 108 to generate a DC output voltage ($V_{out}$) on the secondary winding. The switching circuit 108, which may include a MOSFET (as illustrated), or some other suitable electronic switching device, controls the current flow through the primary winding of the transformer 106 to effectively switch the transformer 106 on and off. Also illustrated in FIG. 1 is an input capacitor ($C_{in}$) that stores the DC input voltage, an output capacitor ($C_{out}$) that stores the DC output voltage, and a diode (D) that prevents current flow back into the secondary transformer winding.

The switching circuit 108 is controlled by a switching control signal 111 that is generated by the switching control circuit 110 as a function of a timing signal having a varying frequency. In the example illustrated in FIG. 1, the timing signal is generated by varying the frequency of a clock signal (CLK) using the spectrum shaping circuit 102, as described in more detail below. This causes the switching frequency of the switching circuit 108 to vary over a period of time, changing the shape of the switching spectrum to include a wider frequency band. By increasing the bandwidth of the switching frequency, the harmonic gain of Vds is decreased thereby resulting in a reduction in EMI.

Figure 2:
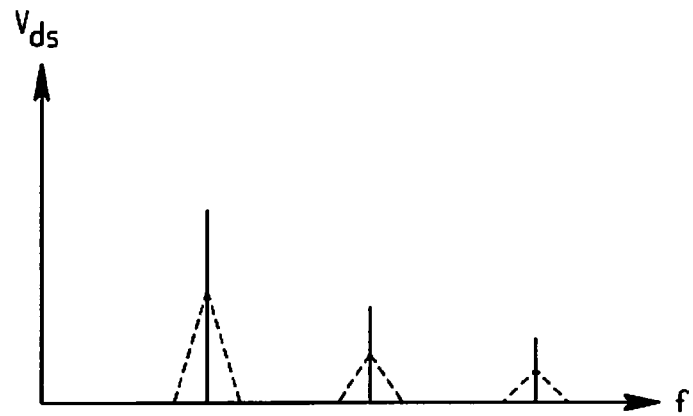
FIG. 2 is a graph showing harmonic gain reduction resultant from varying the switching frequency in the switching mode power supply of FIG. 1.

To help illustrate the resultant EMI reduction, FIG. 2 provides a comparison between the harmonic gain of $V_{ds}$ in a typical switching mode power supply with a constant switching frequency and the harmonic gain of $V_{ds}$ in the example of FIG. 1. In the graph shown in FIG. 2, the three solid vertical lines illustrate the main harmonics of $V_{ds}$ in a typical switching mode power supply. The dotted lines represent the reduced harmonics possible in the switching mode power supply of FIG. 1 in which the switching frequency is varied. As illustrated, by varying the switching frequency, the harmonics of $V_{ds}$ are distributed over a wider spectrum and the peak harmonics are reduced. This results in a decrease in the system EMI.

With reference again to FIG. 1, the switching circuit 110 in the illustrated example includes an RS flip-flop 112, a feedback circuit (114, 116, 118), and a timing circuit (102, 120). The feedback circuit generates the reset input (R) to the RS flip-flop 112 using a current sense circuit 114, a voltage feedback circuit 116 and a comparison circuit 118. The timing circuit generates a clock signal (CLK) as the set input (S) to the RS flip-flop 112 using the spectrum shaping circuit 102 and an oscillator 120. The RS flip-flop 112 gives the reset signal (R) priority over the set signal (S). Therefore, a logic low output is generated on the Q output of the flip-flop (i.e., the switching control signal 111) while the reset input (R) is in a high logic state, which causes the MOSFET switch 108 to turn off, stopping current flow through the primary winding of the transformer 106. A high logic state at the set input (S) to the flip-flop (while R is low) will generate a logic high output at Q, causing the MOSFET switch 108 to turn back on, allowing current flow through the primary winding.

Figure 5:
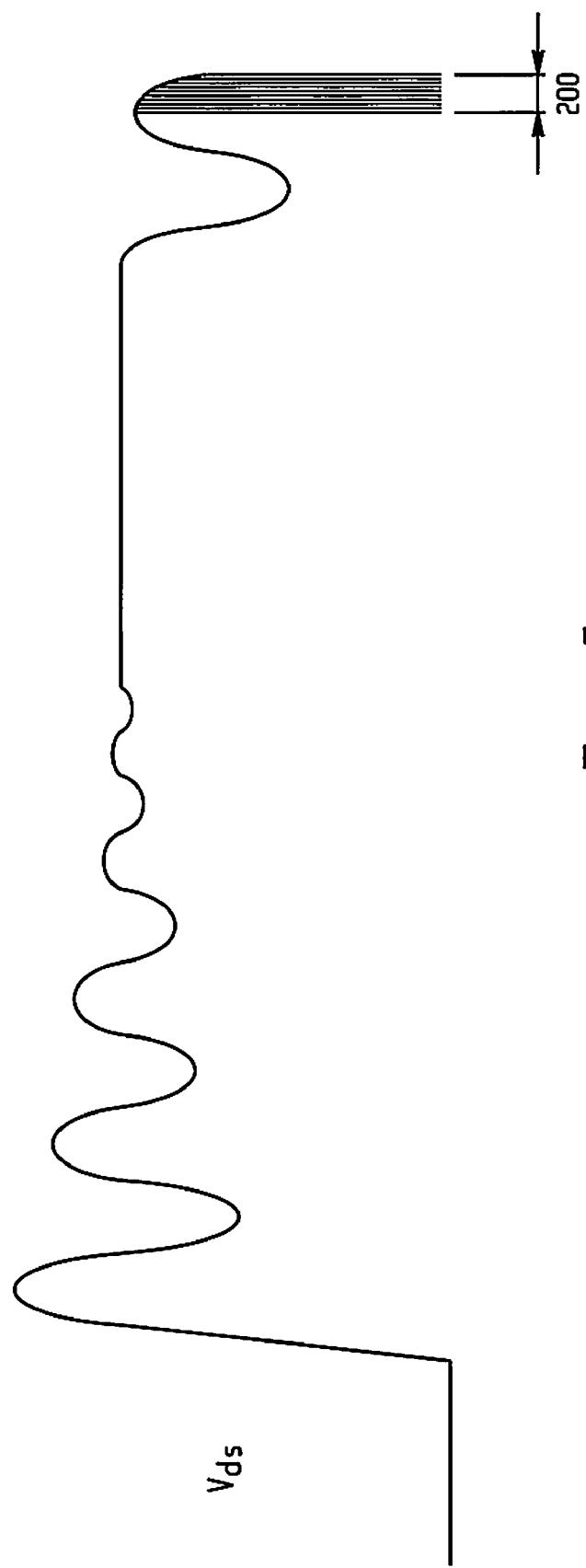
FIG. 5 depicts an example of the switch waveform ($V_{ds}$) for the switching mode power supply of FIG. 1.

In the feedback circuit, the current sensing circuit 114 generates a current sense signal (Isense) that is proportional to the current flow through the primary winding of the transformer 106, and the voltage feedback circuit 116 generates a feedback signal (FB) that provides a threshold to regulate the DC voltage output ($V_{out}$) of the transformer 106 to a desired value. The current sense signal ($I_{sense}$) is compared to the feedback signal (FB) by the comparison circuit 118, which is a single comparator in the illustrated example, to generate the reset input (R) to the flip-flop 112. The comparison circuit 118 thus generates a logic high pulse at the reset input (R) when the current sense signal ($I_{sense}$) reaches the threshold set by the feedback signal (FB). In the timing circuit, a fixed-frequency oscillator 120 is used to generate a clock signal (CLK), and the frequency of the clock signal (CLK) is varied by the spectrum shaping circuit 102 to generate the timing signal as the set input (S) to the RS flip-flop 112. In this way, the transformer 106 continuously cycles through off and on periods as the current sense signal ($I_{sense}$) causes the MOSFET switch 108 to turn the transformer 106 off and the clock pulses of the timing circuit turn the transformer 106 back on. By varying the frequency of the clock pulses, the turn on point of the MOSFET switch 108 becomes variable, as shown in FIG. 5, which reduces the system EMI.

Figure 3:
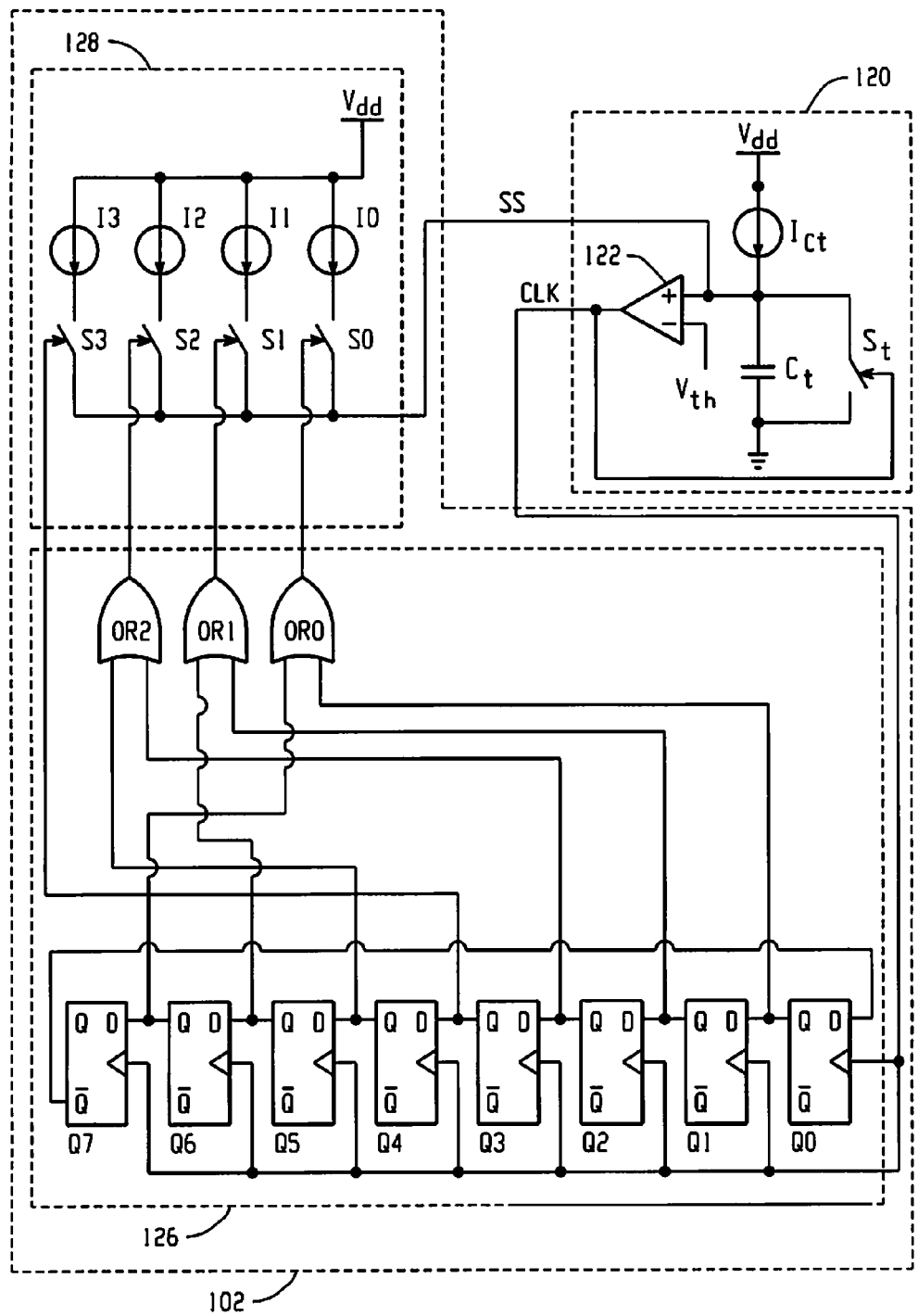
FIG. 3 is a diagram of an example timing circuit for the switching mode power supply of FIG. 1.

FIG. 3 is a diagram of an example timing circuit for the switching mode power supply of FIG. 1. The timing circuit includes a spectrum shaping circuit 102 and an oscillator 120. In the oscillator 120, the voltage across a charging capacitor ($C_t$) is charged by the combination of a fixed current source ($I_{ct}$) and a spectrum shaping signal (SS) received from the spectrum shaping circuit 102. A clock pulse (CLK) is generated by a comparator 122 when the voltage across the charging capacitor ($C_t$) reaches a threshold voltage ($V_{th}$). The clock signal (CLK) also controls a switch ($S_t$) to discharge the charging capacitor ($C_t$) at each clock pulse. In operation, the oscillator 120 generates a clock signal (CLK) with a varying frequency as a result of a varying current provided by the spectrum shaping signal (SS).

The spectrum shaping circuit 102 generates the varying spectrum shaping signal (SS) using a shift register 126 that controls the output of a series of switched current sources (I3-I0) in a digital-to-analog (D/A) converter 128. The shift register 126 includes a series of D flip-flops (Q0-Q7) that are driven by the clock signal (CLK) from the oscillator 120 and are configured to shift a logic "1" through the shift register with each clock pulse. The output of the shift register (Q0-Q7) is input to a series of logic gates (OR2-OR0) to generate a four bit digital control word that is input to the D/A converter 128. In the D/A converter 128, the four bit control word is converted into an analog spectrum shaping (SS) signal by controlling a series of switches (S0-S3) that vary the current of SS by switching the sources (I3-I0) on and off.

Figure 4:
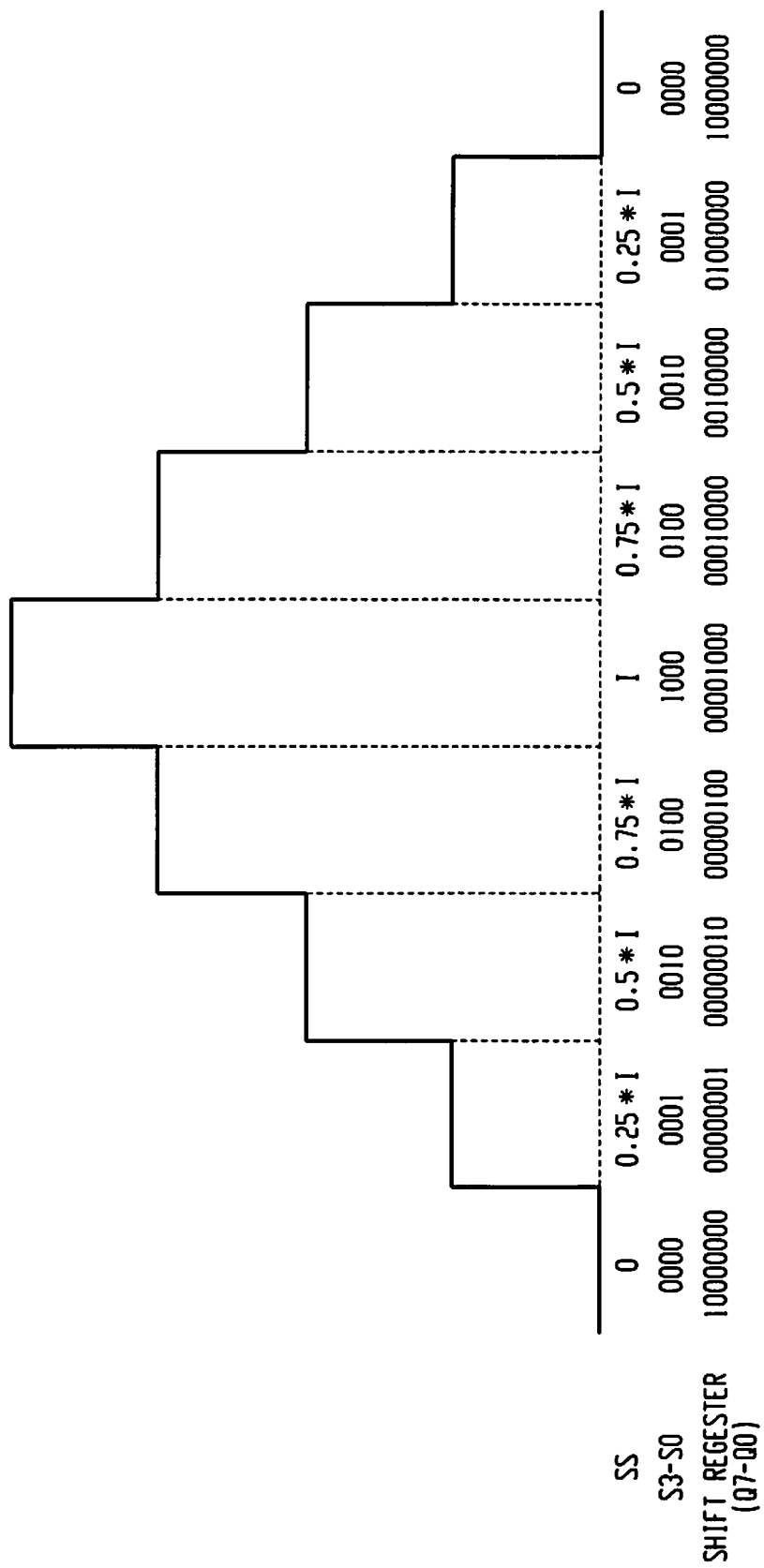
FIG. 4 illustrates an example operation of the spectrum shaping circuit of FIG. 1.

An example operation of the spectrum shaping circuit 102 through one cycle of the SS signal is illustrated in FIG. 4. As shown in FIG. 4, each clock of the shift register (Q7-Q0) causes the series of switches (S3-S0) to increment the current of SS. Specifically, switch S0 is used to supply 0.25 I, switch S1 is used to supply 0.5 I, switch S2 is used to supply 0.75 I, and switch S3 is used to supply I. In the illustrated example, the spectrum shaping circuit 102 is configured to increment SS in a repeating pattern from 0 to a peak value (I) and then back down to 0. In this way, the current of the SS signal that charges the capacitor ($C_t$) in the oscillator 120 is incremented with each clock pulse (CLK), causing the frequency of the clock signal (CLK) to vary as a function of SS. That is, as the SS current increases, so does the clock frequency.

FIG. 5 shows an example of the voltage ($V_{ds}$) across the MOSFET switch 108 in FIG. 1 while the switch is turned off. FIG. 5 illustrates how the turn-on point 200 of the MOSFET switch 108 varies (within the shaded area 200) as a result of the variation of the clock signal (CLK). This variation in the switch's turn-on point 200 results in a variable switching frequency that spreads the harmonics of $V_{ds}$ over a wider spectrum at turn-on, causing a reduction in EMI as explained above.

Figure 6:
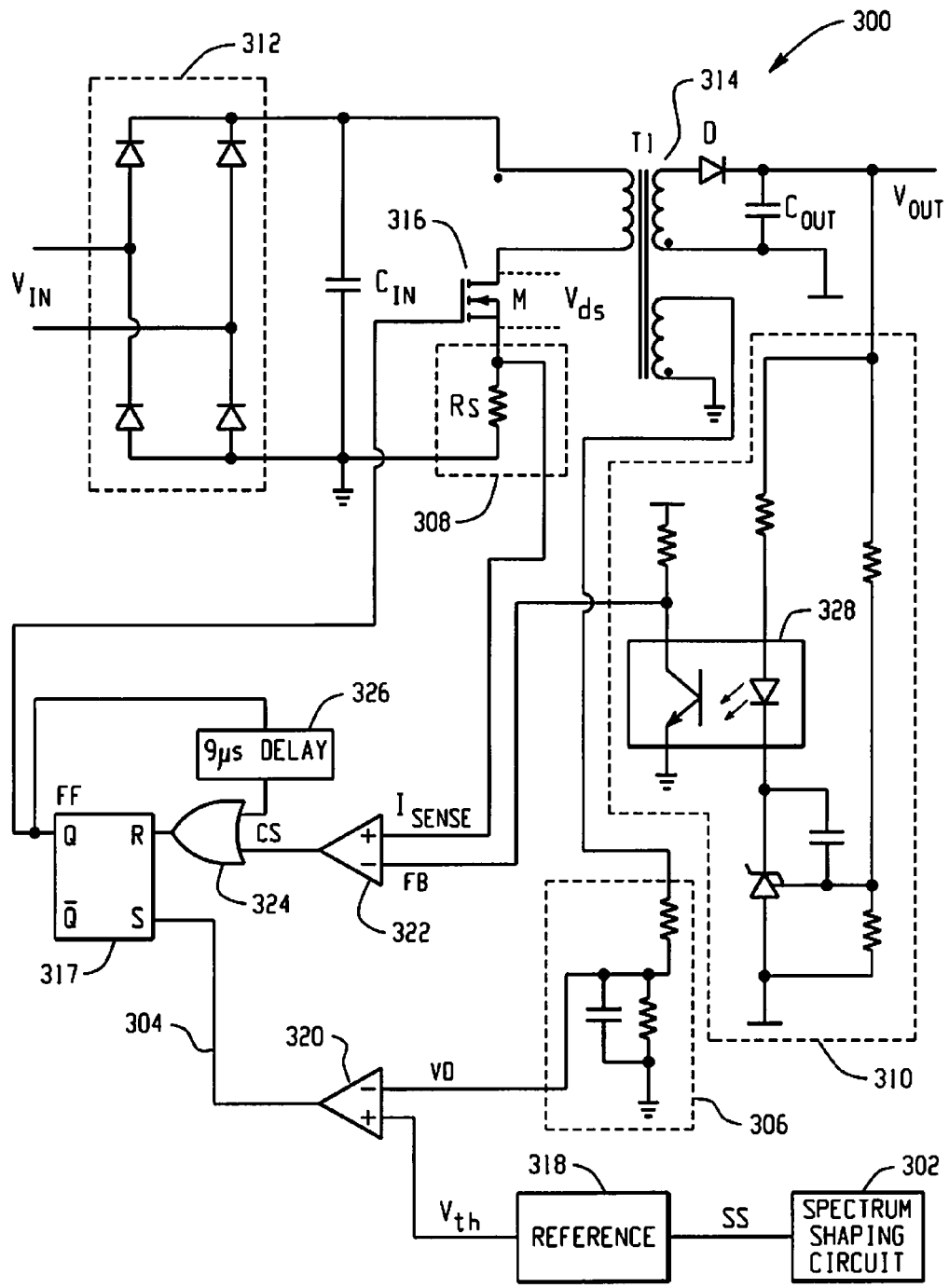
FIG. 6 is a diagram illustrating another example switching mode power supply having a spectrum shaping circuit.

FIG. 6 is a diagram illustrating another example switching mode power supply 300 having a spectrum shaping circuit 302 that varies the switching frequency of the power supply. In this example, the timing signal 304 that varies the switching frequency is generated using a quasi-resonance converter that includes a valley detection circuit 306 to align the switching frequency with a valley in the switching waveform ($V_{ds}$). This quasi-resonant switching technique reduces power loss in the transformer, further increasing the system's efficiency. FIG. 6 also illustrates example circuit implementations for the current sensing circuit 308 and the feedback circuit 310, which could also be used in the example of FIG. 1.

The switching mode power supply 300 illustrated in FIG. 6 includes a rectifier bridge 312, a transformer 314 having a primary winding and two secondary windings, a switching circuit 316, and a switching control circuit having an RS flip-flop 317, a feedback circuit and a timing circuit. In this example, the timing circuit includes a spectrum shaping circuit 302, a reference circuit 318, a valley detection circuit 306 and a comparison circuit 320. The feedback circuit includes the current sensing circuit 308, the feedback circuit 310, a comparison circuit 322, a logic gate 324, and a delay circuit 326.

Figure 7A:
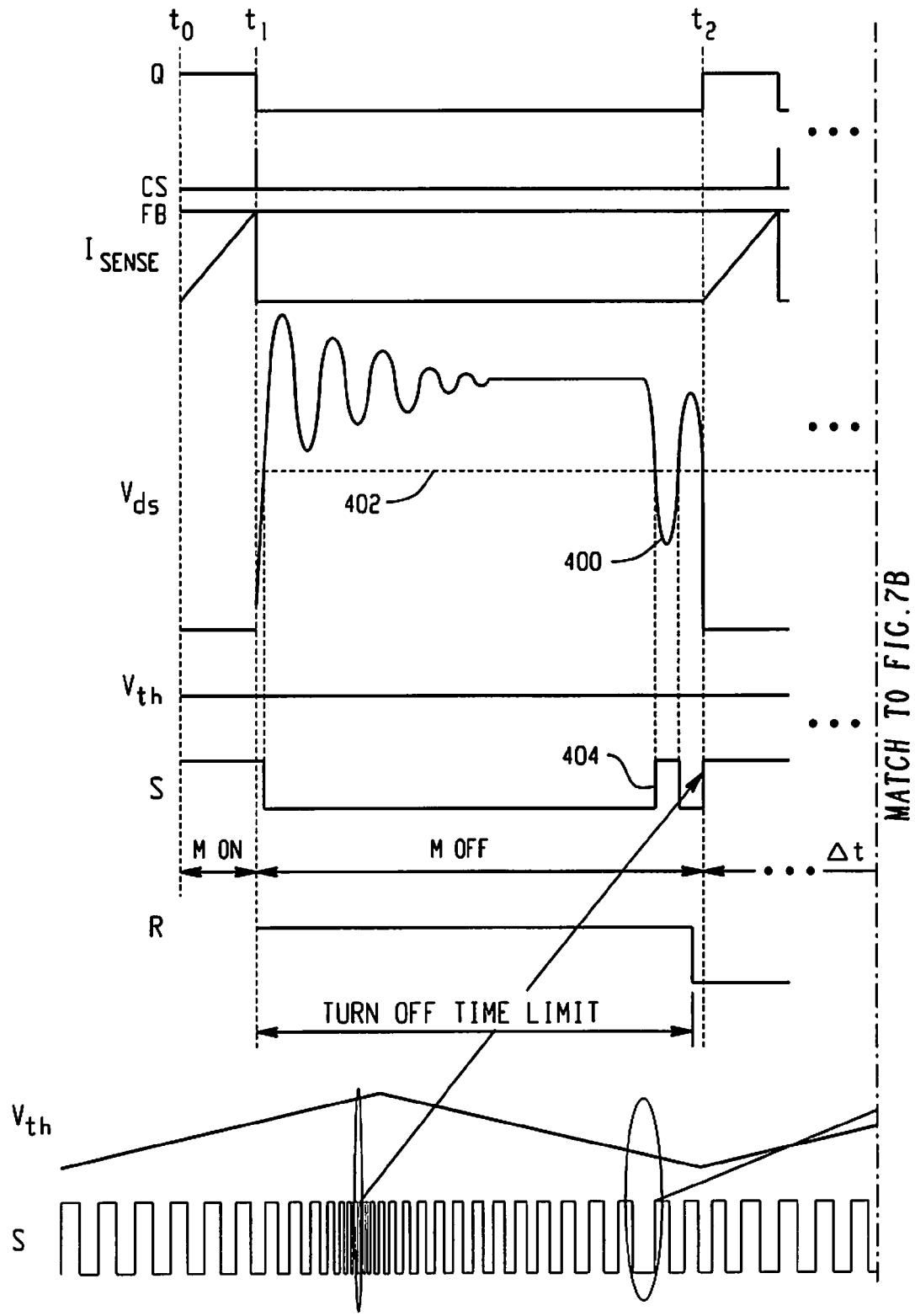
FIGS. 7A and 7B depict a timing diagram illustrating an example operation of the switching mode power supply of FIG. 6.
Figure 7B:
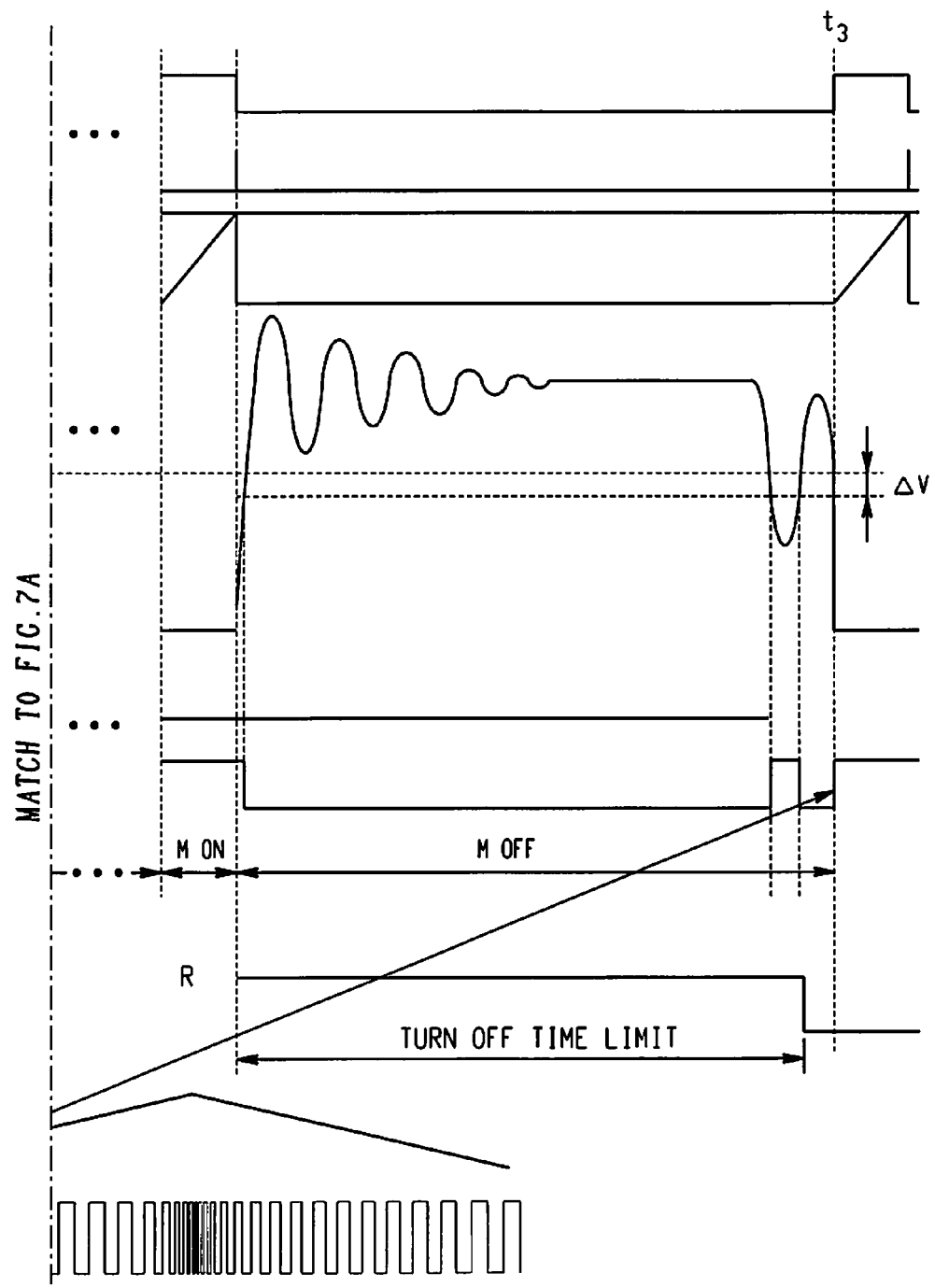

In the current sensing circuit 308, a resistor ($R_s$) is included to provide a voltage ($I_{sense}$) that is proportional to the amount of current flowing through the primary winding of the transformer 314. In the feedback circuit 310, a voltage regulator 328 (e.g., TL431) is configured to provide a reference voltage (FB) that maintains a desired voltage level for the DC voltage output ($V_{out}$) by controlling the amount of time that the transformer remains on during each cycle of the timing circuit. The desired DC voltage output ($V_{out}$) may be set by varying the resistor values in the feedback circuit 310 to adjust the level of the threshold voltage (FB), which is compared to the current sense signal ($I_{sense}$) by the comparison circuit 322. The output of the comparison circuit 322 is coupled to the reset input (R) of the flip-flop 317 through the OR logic gate 324. As illustrated in FIG. 7, this causes the MOSFET switch 316 to turn off (creating a voltage across $V_{ds}$) when the current sense signal ($I_{sense}$) reaches the reference voltage (FB).

Figure 10:
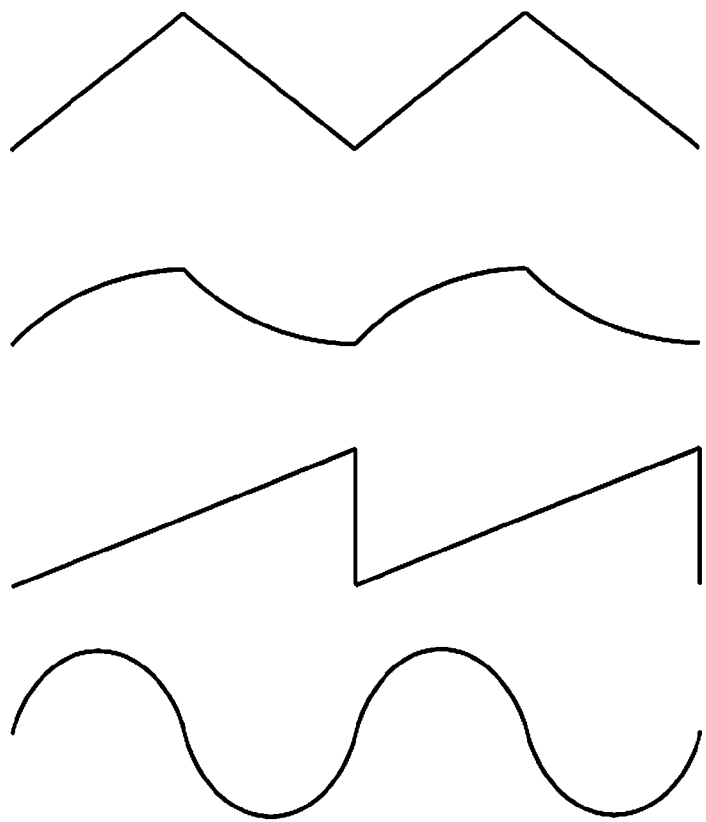
FIG. 10 illustrates example periodic waveforms that may be used by the timing circuit in FIG. 6.

With reference again to FIG. 6, a periodic threshold voltage ($V_{th}$) is compared with a valley detect signal (VD) to generate the timing signal 304 with a varying frequency that is received by the set input (S) to the flip-flop 317. The valley detection circuit 306 monitors the voltage across the third winding of the transformer 314, which samples the shape of the voltage ($V_{ds}$) across the MOSFET switch 308. The valley detection circuit 306 includes an RC network that is configured to generate a pulse on its output (VD) when Vds falls below a preset threshold voltage that is determined by the resistance and capacitance values in the RC network. The periodic threshold voltage ($V_{th}$) is generated by the spectrum shaping circuit 302 and the reference circuit 318. Several possible examples for the periodic threshold voltage ($V_{th}$) are illustrated in FIG. 10, and two example implementations for the spectrum shaping circuit 302 are described below with reference to FIGS. 11-13. With reference again to FIG. 6, the spectrum shaping circuit 302 generates a spectrum shaping signal (SS) to control the frequency variation. The spectrum shaping signal (SS) is added to a DC reference voltage by the reference circuit 318 to generate the periodic threshold voltage Nth). The DC reference voltage applied by the reference circuit 318 may, for example, be a 0V reference or a positive DC voltage, such as 50 mV.

FIG. 7 is a timing diagram that illustrates an example operation of the switching mode power supply 300 shown in FIG. 6. The upper portion of FIG. 7 provides a timing diagram for the switching circuit ($V_{ds}$) and the switching control circuit during two pulses of the timing signal (S). The lower portion of FIG. 7 illustrates an example of the periodic threshold voltage ($V_{th}$) and the timing signal (S) over a greater period of time. As illustrated, the frequency of the timing signal (S) varies as a function of $V_{th}$. The two pulses of the timing signal (S) that are illustrated in the upper portion of FIG. 7 are circled in the lower portion of FIG. 7.

The timing diagram in FIG. 7 begins at $t_0$ as the MOSFET switch 316 is turned on causing current to flow through the primary winding of the transformer 312. The current through the primary winding increases as $C_{in}$ is charged, as illustrated by the ramp in the current sense signal ($I_{sense}$). Once the current sense signal ($I_{sense}$) reaches the threshold (FB) set by the feedback circuit 310 at $t_1$, the reset input (R) causes the MOSFET switch 316 to turn off. With reference again to FIG. 6, the delay circuit 326 causes the MOSFET switch 316 to stay off for a preset delay time period (9 μs in this example), which is illustrated in FIG. 7 by the turn off time limit for the reset signal (R).

As shown in FIG. 7, the switch waveform ($V_{ds}$) includes a valley 400 during the turn off period that is caused by leakage due to resonance with the parasitic capacitance of the MOSFET switch 316. When the valley 400 in the switch waveform ($V_{ds}$) passes below the threshold 402, the valley detection circuit 306 causes an initial pulse 404 to occur on the set input (S). However, because this initial pulse 404 occurs during the preset delay period of the delay circuit 326, the initial pulse 404 does not cause the Q output to change states (R has priority over S). The MOSFET switch 316 is then turned back on by the set input (S) at the next leading edge of the timing signal, which occurs at $t_2$ in FIG. 7.

Figure 8:
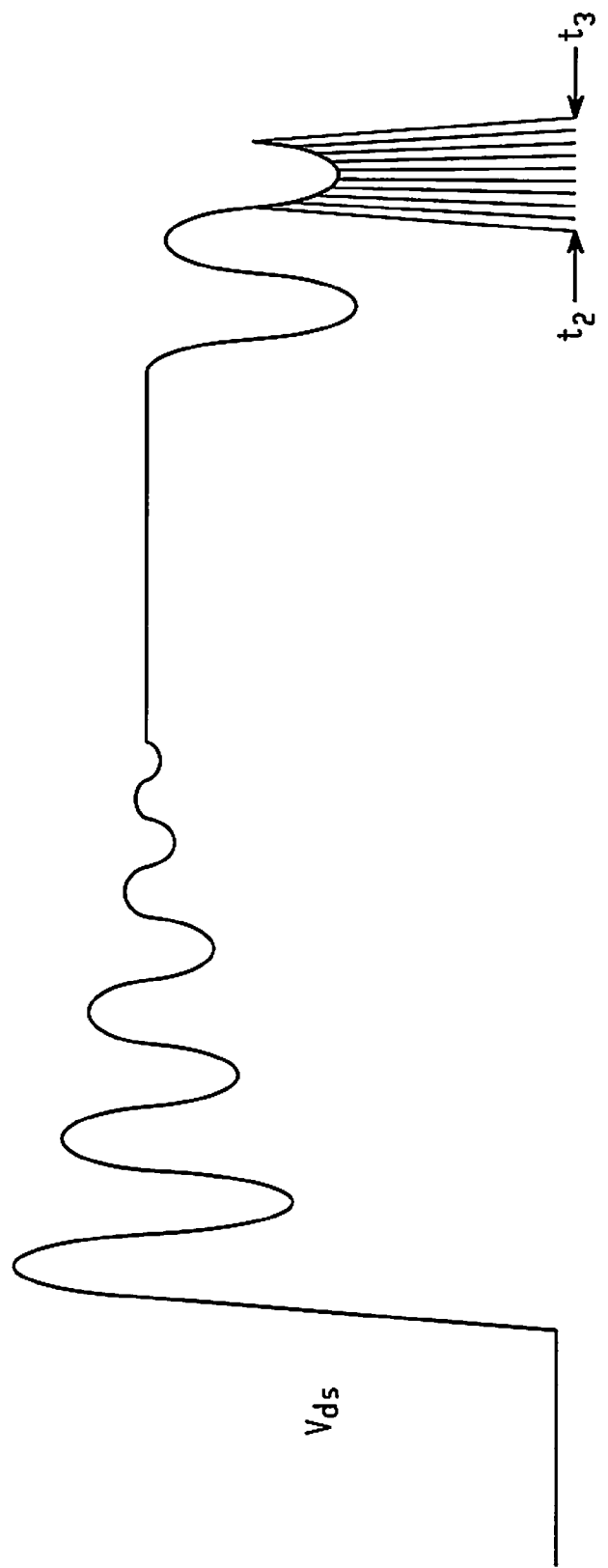
FIG. 8 depicts an example of the switch waveform ($V_{ds}$) for the switching mode power supply of FIG. 6.
Figure 9:
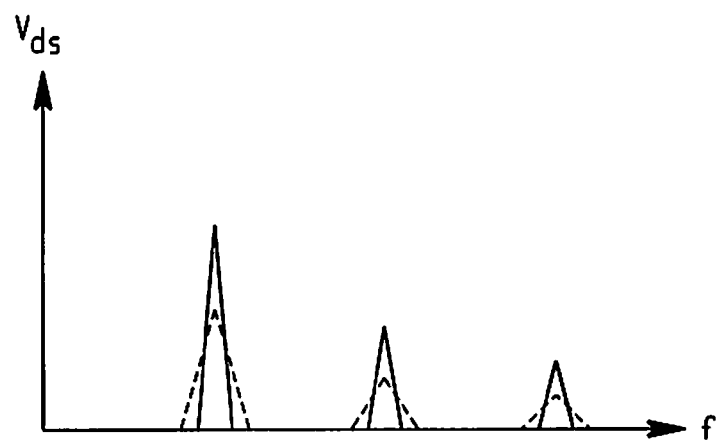
FIG. 9 is a graph showing harmonic gain reduction resultant from varying the switching frequency in the switching mode power supply of FIG. 6.

Timing reference points $t_2$ and $t_3$ in FIG. 7 respectively illustrate the turn on points at the highest and lowest frequencies of the timing signal (S). As shown, the frequency of the timing signal (S) varies the distance between the turn off time limit set by the delay circuit 326 and the turn on point ($t_2$ and $t_3$). The variation in the transformer turn on point is also illustrated in the switch waveform ($V_{ds}$) shown in FIG. 8. By increasing the bandwidth of the switching frequency, as illustrated in FIG. 8, the harmonic gain of $V_{ds}$ is decreased resulting in a reduction in system EMI. An example of the resulting reduction in the harmonic gain of $V_{ds}$ is illustrated in FIG. 9. The graph depicted in FIG. 9 includes three solid lines that illustrate the main harmonics of $V_{ds}$ in a typical switching mode power supply and three dotted lines that illustrate the harmonics possible in the example of FIG. 6. As shown, the peak harmonics are reduced, resulting in an overall decrease in EMI.

Figure 11:
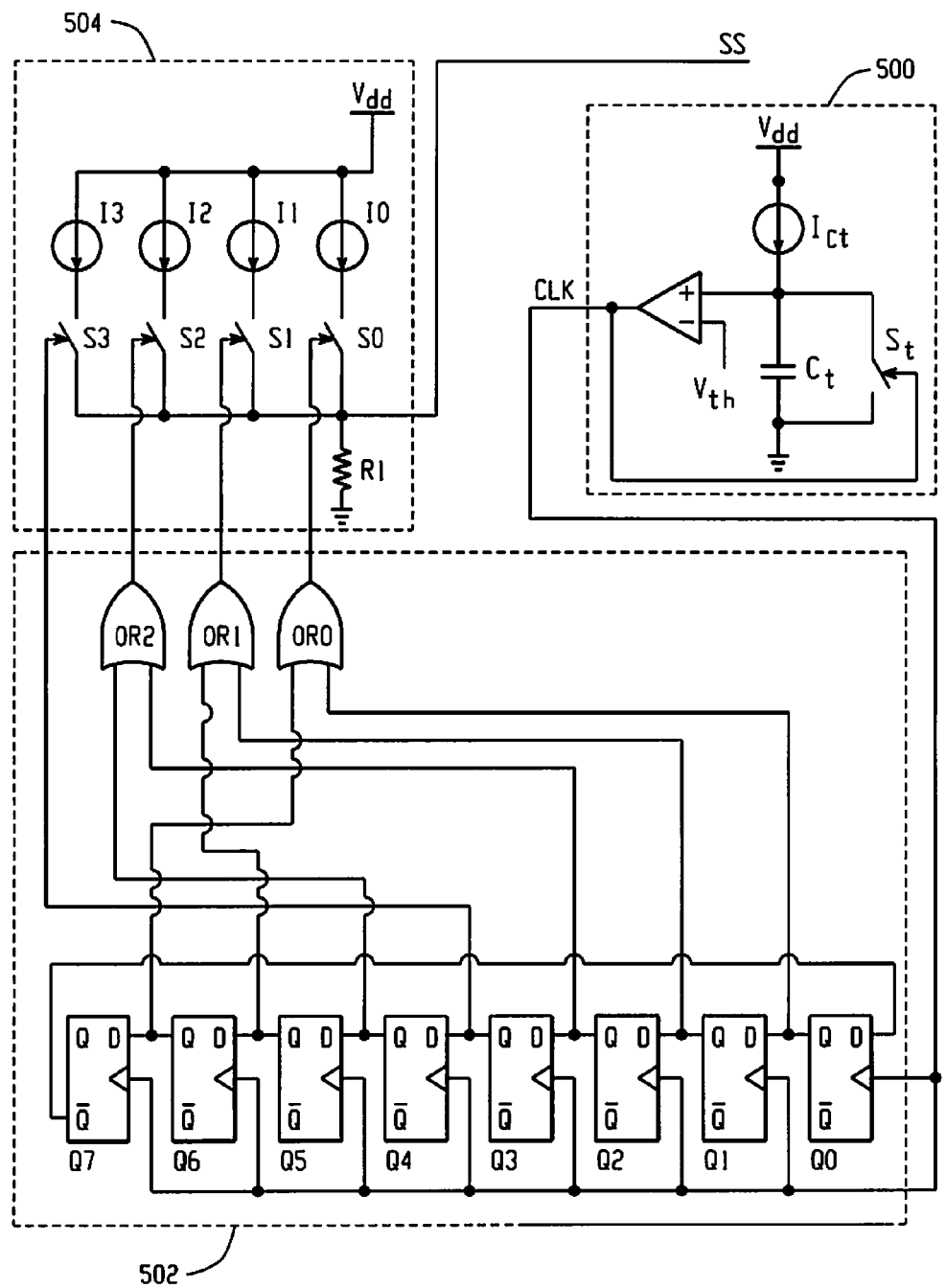
FIG. 11 is a diagram of an example spectrum shaping circuit for the switching mode power supply of FIG. 6.

FIG. 11 is a diagram of an example spectrum shaping circuit 302 for the switching mode power supply of FIG. 6. The spectrum shaping circuit includes an oscillator 500, a shift register 502 and a D/A converter 504. The oscillator 500 in this example is a voltage controlled oscillator that generates a clock output (CLK) that has a fixed frequency set by a threshold voltage ($V_{th}$). The clock output (CLK) is used to drive the shift register 502 and also supplies the clock (not shown) for the RS flip-flop 317.

The shift register 502 includes a series of D flip-flops (Q0-Q7) that are clocked by the clock output (CLK) of the oscillator 500 and are configured to shift a logic "1" through the shift register with each clock pulse. The output of the shift register (Q0-Q7) is input to a series of logic gates (OR2-OR0) to generate a four bit digital control word that is converted into an analog signal (SS) by the D/A converter 504. An example operation of the spectrum shaping circuit through one cycle of the SS signal is illustrated in FIG. 4. As shown in FIG. 4, each clock of the shift register (Q7-Q0) causes the series of switches (S3-S0) in the D/A converter to increment the current of SS, generating a stepped waveform. This stepped SS waveform is input to the reference circuit 318, as shown in FIG. 6, to generate a periodic threshold voltage ($V_{th}$).

Figure 12:
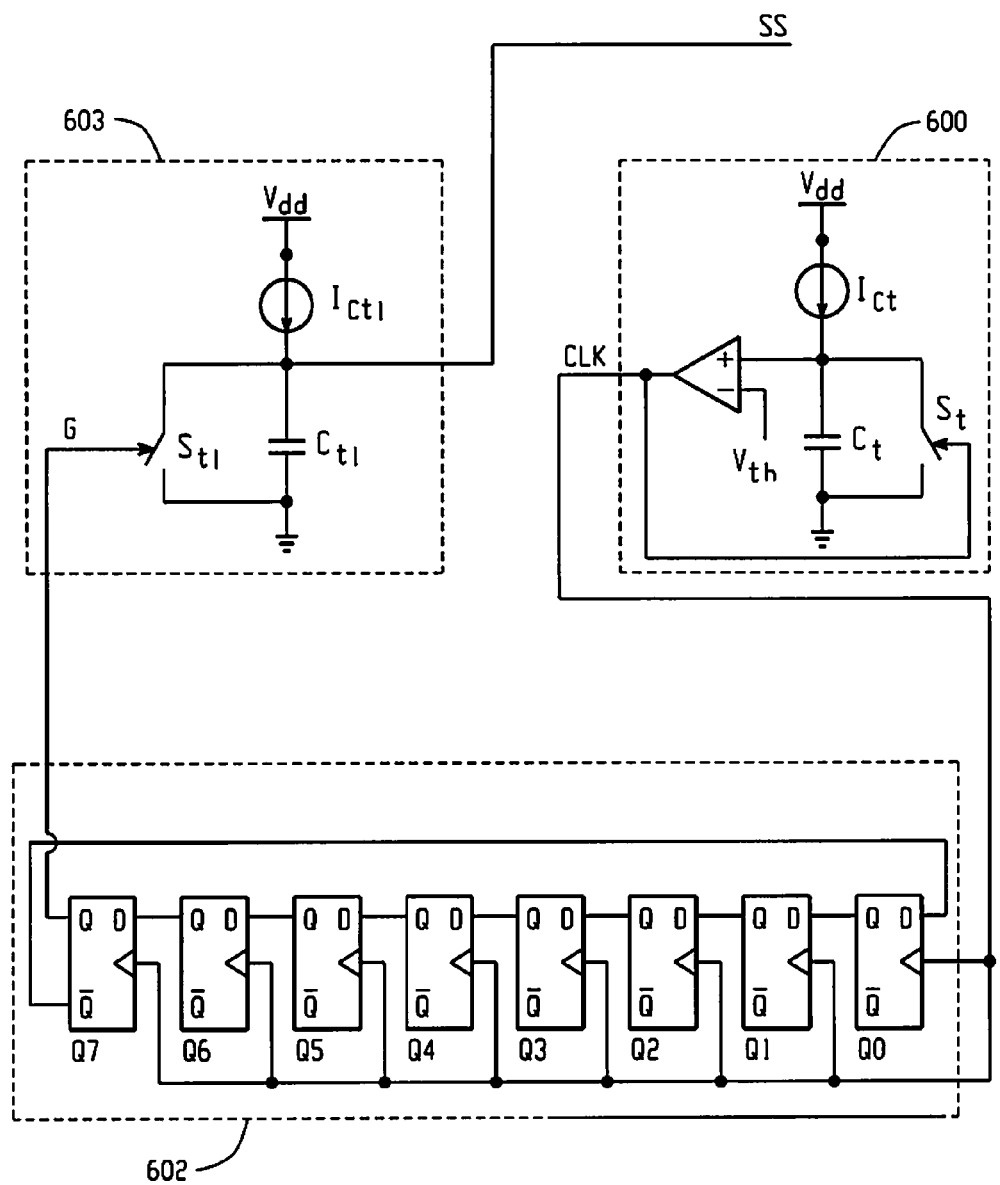
FIG. 12 is a diagram of another example spectrum shaping circuit for the switching mode power supply of FIG. 6.
Figure 13:
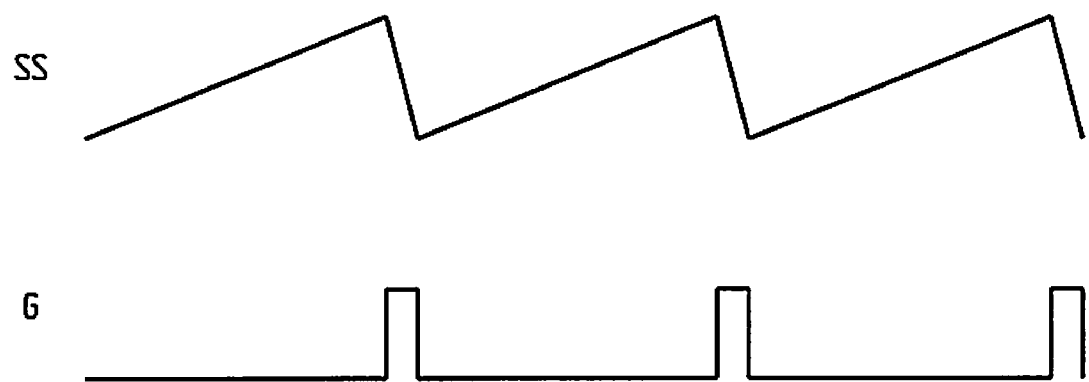
FIG. 13 is a timing diagram that illustrates the operation of the spectrum shaping circuit of FIG. 12.

FIG. 12 is a diagram of another example spectrum shaping circuit 302 for the switching mode power supply of FIG. 6. The spectrum shaping circuit 302 includes a voltage controlled oscillator 600, a shift register 602 and a D/A converter 603. The voltage controlled oscillator 600 generates a fixed frequency clock signal (CLK), set by the threshold voltage ($V_{th}$), that drives the shift register 602. In this example, the shift register 602 includes a series of D flip-flops (Q0-Q7) that are configured to generate a serial output signal (G). As shown in FIG. 13, the shift register 602 generates a single pulse on the serial output (G) every eight clock cycles.

With reference again to FIG. 12, the serial output signal (G) from the shift register 602 is used to control the SS output from a D/A converter 603. Specifically, the D/A converter 603 includes a fixed current source ($I_{ct1}$) that charges the voltage stored by a charging capacitor ($C_{t1}$). The serial output signal (G) from the shift register 602 controls a switch ($S_{t1}$) in the D/A converter 603 to discharge the charging capacitor ($C_{t1}$) every eight clock cycles, creating a saw wave output at SS, as shown in FIG. 13.

This written description uses examples to disclose the invention, including the best mode, and also to enable a person skilled in the art to make and use the invention. The patentable scope of the invention may include other examples that occur to those skilled in the art.

We claim:

1. A switching mode power supply, comprising:
   a rectifier;
   a transformer having a primary winding coupled to the rectifier and a secondary winding;
   a switching circuit coupled to the primary winding of the transformer to control current flow through the primary winding of the transformer based on a switching control signal; and
   a switching control circuit to generate the switching control signal as a function of a timing signal having a varying frequency, wherein the varying frequency of the timing signal causes a switching frequency of the switching circuit to vary over a period of time, wherein the switching control circuit comprises:
      a flip-flop that outputs the switching control signal as a function of a set input and a reset input;
      a feedback circuit that generates the reset input to the flip-flop, the feedback circuit being configured to monitor the current flow through the primary winding of the transformer and to produce a state change on the reset input when the current flow through the primary winding reaches a threshold; and
      a timing circuit that generates the timing signal as the set input to the flip-flop, the timing circuit including a spectrum shaping circuit that causes the varying frequency of the timing signal.

2. The switching mode power supply of claim 1, wherein the feedback circuit includes a voltage regulator that is configured to generate the threshold that is compared with the current flow through the primary winding, wherein the threshold generated by the voltage regulator is set to produce a desired DC output voltage.

3. The switching mode power supply of claim 1, wherein the timing circuit comprises an oscillator coupled to the spectrum shaping circuit, and wherein the spectrum shaping circuit varies the frequency of a clock signal generated by the oscillator to produce the timing signal.

4. The switching mode power supply of claim 1, wherein the timing circuit comprises:
   a valley detector circuit that generates a valley detection signal as a function of a switching voltage across the switching circuit, wherein the valley detection signal indicates when the switching voltage falls below a threshold voltage;
   the spectrum shaping circuit that is configured to generate a spectrum shaping signal;
   a reference circuit that is configured to generate a periodic threshold voltage as a function of the spectrum shaping signal, wherein the frequency of the periodic threshold voltage is set by the spectrum shaping signal; and
   a comparison circuit that compares the valley detection signal with the periodic threshold voltage to generate the timing signal that is input as the set input to the flip-flop, wherein the varying frequency of the timing signal is caused by the periodic threshold voltage.

5. The switching mode power supply of claim 4, wherein the feedback circuit includes a delay circuit coupled in a feedback loop between the switching control signal and the reset input to the flip-flop, the delay circuit causing the switching circuit to remain in an off state for a preset amount of time after a state change on the reset input is caused by the current flow through the primary winding reaching the threshold.

6. The switching mode power supply of claim 1, wherein the switching circuit comprises a MOSFET switch.

7. The switching mode power supply of claim 4, wherein the transformer includes an additional secondary winding and wherein the valley detector circuit samples the switching voltage by monitoring a voltage across the additional secondary winding.

8. The switching mode power supply of claim 4, wherein the spectrum shaping circuit comprises:
   an oscillator that generates a clock signal;
   a shift register that is clocked by the clock signal and that is configured to generate a digital control signal; and
   a digital to analog converter that is configured to convert the digital control signal into the spectrum shaping signal.

9. The switching mode power supply of claim 3, wherein the timing circuit comprises:
   the oscillator that generates the clock signal;
   a shift register that is clocked by the clock signal and that is configured to generate a digital control signal; and
   a digital to analog converter that is configured to convert the digital control signal into an analog spectrum shaping signal;
   wherein the analog spectrum shaping signal is fed back to the oscillator to vary the frequency of the clock signal to product the timing signal.

* * * * *